United States Patent [19]

Gaerttner

[11] 3,786,672

[45] Jan. 22, 1974

[54] TWO-DIMENSIONAL COILS FOR ELECTRO-MAGNETIC GENERATION AND DETECTION OF ACOUSTIC WAVES

[75] Inventor: Martin R. Gaerttner, Ithaca, N.Y.

[73] Assignee: The United States of America as represented by the United States Atomic Energy Commission, Washington, D.C.

[22] Filed: Sept. 20, 1972

[21] Appl. No.: 290,684

[52] U.S. Cl......... 73/67.5 R, 73/67.8 R, 73/71.5 U, 324/40
[51] Int. Cl. ........................................... G01n 29/04
[58] Field of Search...... 73/67.5 R, 67.6, 67.7, 67.8, 73/71.5 U; 324/40; 340/15

[56] References Cited
UNITED STATES PATENTS
3,460,063  8/1969  Houck et al. .......................... 340/15
3,583,213  6/1971  Houck et al. ..................... 73/67.5 R

OTHER PUBLICATIONS

Legg et al., Flaw Detection in Metals Using Electromagnetic Sound Generation, J. Phys. D Appl. Phys (GB) Oct. 1970, p. 61–63.
Meredith et al., Electromagnetic Generation of Ultrasonic Waves in Metals, J.A.S.A. June 1969, p. 1393–1401.

Primary Examiner—Richard C. Queisser
Assistant Examiner—John P. Beauchamp
Attorney, Agent, or Firm—Roland A. Anderson; John A. Haran; Cornell D. Cornish

[57] ABSTRACT

Apparatus and method for producing and detecting magnetic and non-magnetic acoustic waves in a conductive body, wherein the waves are generated electromagnetically by a constant amplitude wave front transmitted to a surface of the body by a two-dimensional, flat, spirally wound coil in a plane parallel to and spaced from the conductive surface, and like coil means or a quartz transducer are used for detection. Specific transducers having dual, race-track shaped, two-dimensional coils are described for selectively generating and detecting magnetic directly generated acoustic waves when the body is immersed in a magnetic field, and non-magnetic directly generated acoustic waves when the magnetic field is reduced or removed entirely. A single spiral, two-dimensional coil, is also used for selectively producing and/or detecting the non-magnetically generated acoustic waves.

6 Claims, 2 Drawing Figures

TWO-DIMENSIONAL COILS FOR ELECTRO-MAGNETIC GENERATION AND DETECTION OF ACOUSTIC WAVES

CROSS-REFERENCE TO RELATED APPLICATIONS

Application Ser. No. 747,977 now U. S. Pat. No. 3,583,213 filed July 26, 1968 "Non-Destructive Testing of Conductive Objects Using Ultrasonic Waves"

BACKGROUND OF THE INVENTION

This invention was made in the course of, or under a contract with the United States Atomic Energy Commission.

In the field of physics, a need exists for the ultrasonic transducer described and shown in U. S. Pat. No. 3,460,063, which was derived from work at Cornell University under, or in connection with a contract with the United States Atomic Energy Commission. According to the system described by Houck et al., the inventor of the above-mentioned patent, turns of fine wire were wound into a solenoid coil of rectangular cross-section, with one side of the coil placed adjacent to a conductive surface on a sample. Thereupon, an RF generator delivered RF pulses of the order of 100 watts peak power to the coil while it was immersed in a DC magnetic field that was appropriately positioned relative to the coil and the sample to induce RF electromagnetic fields and/or currents in the conductive surface on the sample, and acoustic waves in the sample. However, the induced current at any point just inside the conducting surface was proportional to the RF magnetic field strength above that point outside the surface; and when placed near the conducting surface, the rectangular solenoid produced a very non-uniform magnetic field at all points on the surface, except for an extremely small region near the center and immediately under the flat side of the coil that was next to the conducting surface. Moreover, while this uniform region could be increased by using a thinner coil of larger area, this procedure decreased the magnitude of the induced current and lowered the sensitivity of the apparatus described by the Houck et al patent. It has also been advantageous to provide a high signal-to-noise ratio in a transducer that does not embody any mechanical coupling (bond) to the sample.

SUMMARY OF THE INVENTION

This invention provides a specific coil means and method for the electromagnetic generation and detection of acoustic waves in a conductive body. More particularly, this invention provides two-dimensional coil means for the detection and/or generation of acoustic waves produced in metals by direct electromagnetic generation. This invention provides a two-dimensional, flat, spirally wound coil in a plane parallel to the conductive surface of a sample body for generating and/or detecting acoustic waves in the sample, and provides (MDG) magnetic direct generation and/or (NMDG) non-magnetic direct generation of waves at cryogenic and/or higher temperature. With the proper selection of elements, geometry and steps, as described in more detail hereinafter, the production and/or detection of the desired waves is achieved.

In preferred embodiment of this invention there is provided apparatus for the electromagnetic generation and detection of acoustic waves within a surface of electrically conductive material, comprising the use of a two-dimensional, flat, spirally wound race-track shaped dual-spiral coil having continuously connected straight sections carrying radio-frequency current situated in a plane parallel to and spaced from the surface mentioned, second similarly constructed and arranged spiral coils being employed for detection of the acoustic waves.

It is an object of this invention, therefore, to provide a specific coil system for the electromagnetic generation and/or detection of acoustic waves;

Other objects and advantages of this invention will hereinafter become obvious from the following description of preferred embodiment of this invention.

BRIEF DESCRIPTION OF THE DRAWING

In the drawing, where like elements have the same reference numbers.

DESCRIPTION OF THE PREFERRED EMBODIMENT

This invention is useful in the electromagnetic generation and/or detection of electromagnetic and acoustic waves in solids. Thus, this invention finds utility in the aircraft and metal industries, particularly for the non-destructive testing of conductive objects, e.g. for the detection of flaws in metals and/or semi-conductors. However, various other utilities for this invention will become apparent from the description herein when read by those skilled in the art, since the electromagnetic generation and detection of waves is broadly useful in the field of physics, e.g., in the field of plasmas, where whistler waves are of interest, and/or in the field of super-conductors.

In understanding the description herein, this invention was found while studying a method of generating (and detecting) untrasound in solid metals (and also liquid metals) through purely electromagnetic means under investigation by the inventor of the invention described herein. Radio frequency pulse echo techniques were used for studying the process, called direct generation (or detection), and measurements of the coupling efficiency of this direct generation were made in several metals for both the local and non-local limits of electrical conductivity. Also, accurate measurement of the temperature, frequency, and magnetic field dependence were made using frequencies between 3 and 100 MHz. As a result, an interesting oscillatory magnetic field dependence of direct generation was found for magnetic fields oriented perpendicular to the direction of acoustic propagation, and this effect was thought to be due to Gantmakher splashes. The coupling efficiency of this direct electromagnetic generation, indicates that the efficiency of the non-local direct generation of these fields become very efficient at microwave frequencies.

In the presence of a static magnetic field, induced eddy currents in an electrically conductive metal sample experience a Lorentz force, the direction of which depends on the orientation of the static field. The Lorentz force, which is transferred to the acoustic medium by collisions, generates longitudinal waves when the static field, which has an initial field strength $B_o$, is parallel to the surface of the sample and has a component that is perpendicular to the eddy currents. Shear waves polarized perpendicular to the eddy currents, are generated when $B_o$ is perpendicular to the surface. For a uniform surface force, Huygen's principle requires an acoustic wave front parallel to the surface.

A somewhat different electromagnetic process exists for high purity metals at low tempertures, when the electron mean free path corresponds to or exceeds the acoustic wavelength. For this case, the force that drives the lattice is parallel to the AC electric field within the anomalous skin depth. This process requires not static magnetic field and is called non-magnetic direct generation (NMDG). NMDG produces only shear waves polarized parallel to the surface current.

The process of direct electromagnetic detection involves the inverse of the described direct electromagnetic generation by MDG and/or NMDG. In this regard, acoustic waves propagating toward a surface boundary, e.g., one boundary of the conductive metal sample, will generate electromagnetic fields outside the metal. For either the generation or detection in the MDG process, the amplitude coupling in the local limit is proportional to the strength $B_o$ of the static magnetic field in materails such as room temperature aluminum. A theoretical discussion of the above is given by the inventor of this application in Report No. 1524, NYO-2150-70, Materials Science Center, Cornell University, Ithaca, New York, the report being entitled, "Direct Generation of Acoustic Waves In Conducting Materials."

Should a two-dimensional, flat, spirally wound, dual-spiral race-track shaped coil be placed in a plane parallel to and spaced from a metal body forming a conductive surface in a static magnetic field, and should this coil be connected to a radio-frequency source for electromagnetically producing electric fields that are transmitted in said surface, this coil provides efficient MDG, since it produces a substantially uniform current distribution, and a substantially constant wave front, as indicated by exponentially decaying echo patterns. Also, linearly polarized currents can be efficiently induced in the conductive surface. This has the advantage that acoustic waves of known polarity are generated with high efficiency. Moreover, this dual spiral can be used for both MDG and/or NMDG and detection.

In another apsect, the two dimensional dual spiral of this invention or a single two-dimensional spiral can can be used for non-magnetic direct generation (NMDG) and/or detection.

Figure 1:
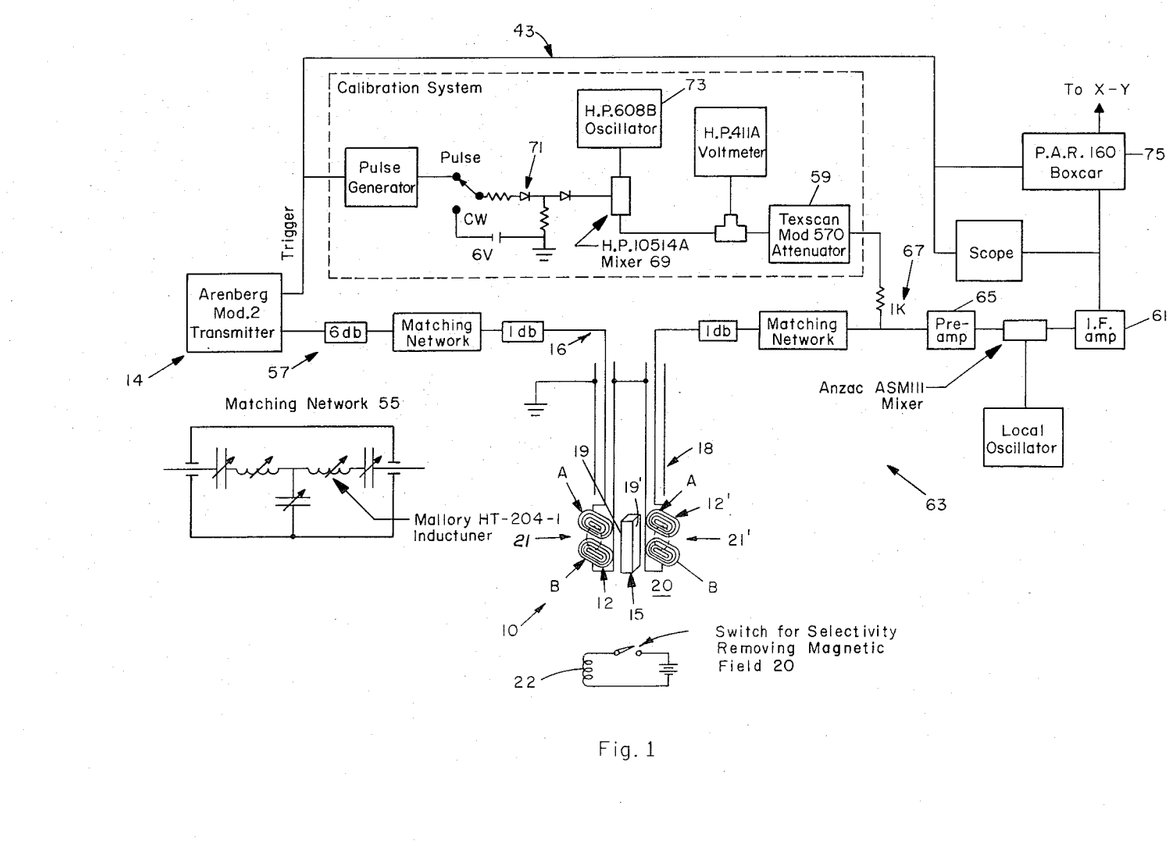
FIG. 1 is a partial top view of one embodiment of this invention.

Referring now to FIG. 1, this figure illustrates one embodiment of the apparatus 10 of this invention. Two dimensional coil 12, which connects to a conventional radio-frequency energy source 14 of currents 16, is spaced in close proximity to a surface of an electrically conductive sample 15, such as the metal cube shown in FIG. 1 that is cooled to low temperature by cryostat 18. In one example, a surface 19 of a sample 15 immersed in a static dc magnetic field 20 of known orientation is produced by means 22, as is conventional for MDG. The coil 12, thus produces the desired MDG, while a like two-dimensional coil acts as the detector. To this end, coil 12' is placed adjacent to the body of sample 15 at a suitable surface, such as the surface 19' of the cube shown in FIG. 1 that is opposite to the surface 19, the orientation of coils 12 and 12' being the same with regard to the metal cube. Thus, the described apparatus 10 provides a MDG transducer 21 in field 20

Also, by reducing the magnetic field 20, e.g., to zero, the same coils 12 and 12' can produce and detect NMDG. To this end, a NMDG transducer 21 and detector 21' are provided by this invention.

In another preferred embodiment, as understood in more detail hereinafter, a single, two-dimensional, flat, spirally wound coil in a plane parallel to and spaced from the sample surface can also be used for NMDG, and this single spiral or a crystal may be used for detection.

Figure 2:
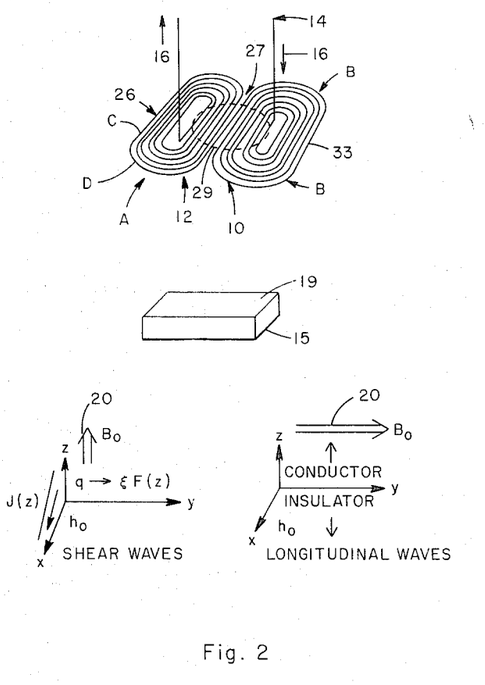
FIG. 2 is an enlarged view of the two-dimensional coils of FIG. 1.

FIG. 2 illustrates an enlarged view of the two-dimensional dual-spiral coils 12 and 12' of FIG. 1. For ease of explanation FIG. 2 shows only one dual spiral coil 12, but it will be understood that this dual spiral coil 12 is identical to the dual spiral coils 12 and 12' of FIG. 1 for either producing and/or detecting MDG and-/or NMDG in sample 15. To this end, the uniformity of the induced opposing currents is a function of distance between the parallel straight portions of the race-track shaped windings 26 of the singlewire 33 and the surface 19. When $d$ exceeds $1/n$, that is the center-to-center spacing between the windings 26 of wire 33 ($n$ is the number of turns per unit length, i.e., the coils are closely wound), the magnitude of the eddy currents is $nI_{in}$ and the uniformity is better than 1 percent. Moreover, the flat, two-dimensional spirals of coil 12, give about a three fold increase in the excitation field in the sample 15 over that produced in the same example for a particular rectangular solenoid coil, such as understood from the above. Had the thickness, $t$, of the rectangular solenoid coil been reduced, this would have resulted in an even larger increase.

As understood from FIG. 1 and FIG. 2, each coil 12 and 12' is a dual-spiral forming a pair of flat (two-dimensional), spiral wound race-track shaped, transducer sections A and B forming adjacent spirals in a plane parallel to and spaced from the sample 15. As shown in FIG. 2, these sections are formed with straight parallel portions C and connecting end portions D that continuously connect to form adjacent spirals wound in opposite directions. Thus, the source 19 flows currents oppositely in coil 12 in operably and automatically adjustable, interactive and parallel pathways forming a flat current sheet having circulating therein from one end thereof, equal, balanced, electromagnetic field producing rising and falling currents that transmit a constant wave front from the circuit central region 27 of the spirals, which is illustrated by the dashed line in FIG. 2.

Typically, the inductance of the flat two-dimensional spirals of coil 12 is halved, when placed within 0.025 cm of the surface 19 of sample 15. In comparison, the inductance reduces by only about 10 percent in the case of the rectangular three-dimensional solenoid coil. Thus, the above-described reduced inductance of the flat spirals of coil 12 enables higher coil currents to pass therethrough from a voltage limited RF generator source of electromagnetic wave energy.

When impedance matching is used to make efficient use of the energy of the RF signal generator source 14, which can be simply referred to as a wave for ease of explanation, the Q of the total circuit must be kept well below Q, herein defined by:

$Q = \pi x$ (rise time needed to resolve echoes) x frequency. Furthermore, the described use of two-dimensional coil 12 does not pick up stray fields.

In determining the dependence of MDG on the separation between the sample 15 and the described coils, the dependence of the signal amplitude in and from the sample 15 on separation between the sample 15 and various two-dimensional spirals for numerous geometries was measured. It was found that the relative signal amplitude increased as the separation decreased between the sample 15 and the generator or detector coil. Measurements covered a separation range of 0.4 cm to about 0 cm. In these tests a fixed rf current source 14 was employed while keeping the gain setting fixed on the receiver attached to the detector.

The temperature dependence of MDG was also measured for the shear waves produced in the sample 15 by the described generator coils. To this end, a measurement of attentuation was made at temperatures from 77 K to 300 K at several frequencies by sweeping the window of a gated, integrating amplifier over several echoes. From the attentuation per echo, it was easy to determine the amplitude at the time of generation. It was found that the acoustic amplitude decayed monotonically as the temperature increased, in agreement with the theory that temperature dependence results primarily from the electrical conductivity decrease as the temperature increases.

Further measurements were made on the temperature dependence of MDG for shear waves in high purity samples between 4.2° K and 100 K in the case where the described spiral coils were used to generate and detect acoustic waves. A weakly dropping temperature dependence of MDG in the generated signals in sample 15 at high temperatures was observed and believed to be due to the non-electrical component of attenuation. Also, a drop in signal at low temperatures from about 10 K to 4.2 K was due in part, though not entirely, to the electronic component of attenuation. Here, the little change in MDG over the temperature range from 4.2 K to 77 K is expected from the theory discussed in the above-mentioned report NYO-2150-70. The small drop at low temperatures is not entirely understood, but it is possible that the magnetic field used, 9 kG, was not sufficiently large to place the generation in the linear magnetic field dependent region.

A fair number of measurements were also made to verify the theoretically predicted dependence of MDG or the bulk acoustic properties of the material, Here the relative efficiency for a number of <100> orientated samples 15 at 77 K with rectangular coils produced large experimental errors due to the above-mentioned non-exponential echo patterns resulting from the rectangular coils.

The relative efficiency of longitudinal and transverse MDG shows the thoretical expected l/s dependence but because of the different rms values of the Lorentz force on the eddy currents in the field of parallel (longitudinal waves) and the field perpendicular (transverse wave) geometries, the mean square field parallel force equals one-half that of the field perpendicular force.

The above-mentioned dependence of MDG upon $B_o$ resulted from measurements for more than ten samples involving high purity metals at 4.2 K, wherein the typical behavior in the local limit depended linearly on field from 10–50 kG. Below 10 kG the behavior might tend toward non-linearity according to theory. Also, fields up to 95 kG can produce some non-linearity in field in some samples 15, e.g., Pb since this $\beta$ term increases due to the large magnetoresistance.

With regard to the absolute frequency dependence of the above-described system, theory predicts the efficiency of MDG to be independent of frequency for $\beta \gg 1$, and experimentally this was observed at the lower frequencies for all samples 15. Measurement on one sample shows a drop in efficiency above 70 MHz and it is believed possible that inadequate surface preparation could cause this decrease in efficiency, particularly since this sample 15 had a dull non-reflecting surface indicating short range roughness on the scale of ½ $\mu$ or greater. Also, some abrasive was believed to have been stuck in or to the surface damage could lower the electrical conductivity, although this is a minimal problem at 77 K. On the other hand, to obtain a 25 percent drop in efficiency at 100 MHz, an effective skin depth of $4\mu$ is required, which is about two times the classical skin depth.

The relative efficiency of longitudinal and transverse MDG shows the theoretical expected l/s dependence but because of the different rms values of the Lorentz force on the eddy currents in the field parallel (longitudinal wave) and the field perpendicular (transverse wave) geometries, the mean square field parallel force equals one-half that of the field perpendicular force.

In regard to the above, while not limited thereto, most of the samples 15 were prepared for measurement in the local limit by parallel grinding and hand surface lapping on carborundum abrasive paper. This method of lapping involved potting the orientated sample 15 in a conventional lapping ring (not shown for ease of explanation) using a low melting point wax, and lapping as gently as possible by employing the weight of the sample assembly for lapping pressure and a kerosene paraffin mixture for a lubricant. This lapped the samples flat and parallel to better than $5\mu$. Tolerances of better than $1\mu$ were obtained by lapping on a stainless steel plate using conventional aluminum oxide powder abrasives and a kerosene-paraffin lubricant mixture. Resulting samples were found to be orientated to better than 1° using Laue x-ray back scattering methods.

The current induced within the skin depth was approximately $nI_{tn}$, where $n$ = turns/cam and $I_{tn}$ was the peak current in the transmitting coil 12, hereinafter referred to as generator 43. This relationship is valid when the coils of the generator 43 were very close to the sample 15 and where n was very large. In one example, the theoretically predicted output voltage for one generator 43 was 270 + 40 $\mu$V/Amp, but since the transmitter coil of the generator 43 was 0.25 mm from the surface 19 of the sample 15, the actual amplitude was somewhat less than the ideal theoretical value mentioned above. However, if one makes a linear extrapolation of the transmitter coil-sample separation to zero, then one finds that the measured signal should be increased by 20 percent to obtain the ideal output voltage. Therefore, excellent absolute agreement with theory is obtained, particularly since an error in $n$ of one-fourth turn in a total of five is possible, so that an overall unvertainty of 10 percent could be possible. As a result, the agreement with theory is compatible with known experimental inaccuracies but is none the less surprising.

In comparison to the above mentioned efficiencies of the transverse waves, a comparison of the relative frequency dependence of MDG for the longitudinal waves in Al and Pb samples 15 at room temperature was made using one ⅜ inch diameter coil 12 for generation and one coil 12' for detection around about 10 MHz. Because of the low frequency, beam spread was a serious problem in the Al sample. Nevertheless, the frequency dependence was as roughly expected. The relatively low efficiency of MDG in lead resulted from its low conductivity ($\beta \sim 5$ at 10 MHz).

While the above has described MDG in solids, MDG likewise occurs in liquids. In this regard, a mercury sample 15 was contained in a plastic cell with parallel, 0.02 cm thick front and back glass surfaces. Echoes, such as understood in the art from the above, occured in such a sample corresponding to the body formed by the sample 15 shown in FIG. 1 as a result of the electromagnetic waves produced therein by coils 12, and when processed by a boxcar integrator, had a signal to noise ratio in excess of 50 with 10 echoes easily measurable.

The relative generation efficiency (relative to room temperature Al) equaled 0.03 at 8 MHz, which although considerably higher than the calculated value of 0.003 for a free surface compared to the value of 0.05 calculated for a fixed surface. Also, resonance occured $\gamma/2$, a condition nearly satisfied at 10 MHz for $n = 0$.

A Cs sample 15 in its original container, a 10 mm diameter glass vial, was also tested at 5 MHz with a 7 kG magnetic field component. A comparision made with Al by replacing the Cs vial with a similar size piece of Al, provided a relative efficiency of about unity, which again fell between the efficiencies calculated for free and fixed surfaces, but closer to the latter.

The above led to the conclusion of reasonable agreement with theory in the direct generation of electromagnetic waves in liquids, assuming that the liquid surface stuck to the glass walls of the container. Moreover, theory predicts a considerably higher efficiency for other liquid metals, such as Na, K, Al, Cu, etc., than for Hg and Cs.

When $B > 1$, careful attention should be given to the container material in order to enhance the conversion efficiency, which could be particularly useful at high temperatures where bond decomposition and oxide layers present problems in acoustic studies of conducting materials near transition that involve large volume changes.

Moreover, MDG signals were also observed in a liquid helium sample using a container with a pair of thin Al windows. Coils 12 in the proximity of the aluminum windows excited and detected 10 MHz ultrasound, which was observed on an oscilloscope for fields as low as a few kG with fairly high efficiency. If the skin depth is small compared to the thickness, $t$, of the surface, and if the acoustic wave length is much greater than $t$, high efficiencies are expected because $l/s$ is very large for liquid He.

In review of the above, experimental observations and measurements demonstrate that MDG in the local limit of conductivity is correctly predicted by theory. Moreover, the equation from p. 25 of NYO-2150-70:

$$\bar{\epsilon} = \oint L \ (- i\omega_c i)/1 - i\beta = l)/1 - i\beta = i \oint B_o K_o 2\rho s c \omega \ l/1 - i\beta = i \oint B_o h_o/4\pi \rho s \omega \ (1/1 - i\beta). \tag{1}$$

correctly predicts the amplitude for generating longitudinal waves and transverse waves.

Although the general theory involves only one type of carrier, the above-described measurements show that the only important electrical parameter is the classical skin depth which was used in developing the simplified local model and the above-mentioned equation from p. 25 of NYO-2150-70. In this regard, it was found in connection with the measurements described above, that at low frequencies, the widely varying efficiencies of direct generation in different metals result primarily from differences in the acoustic properties of the material. Thus, at low temperatures of about 4.2 K, the described efficiency of MDG produced and detected by the described coil 12 is high for many materials even up to the GHz range. It will be understood, therefore, that the described coil 12 in combination with the described samples 15, in close proximity therewith, and arranged in the described magnetic field 20 to produce longitudinal or transverse acoustic waves as described above, provide an improved transducer system 21. In this regard, because of the absence of acoustic bonds in the described apparatus 10, MDG holds promise for nearly any measurement involved with materials that expand and contract. Still further, the described MDG apparatus 10 is more efficient than electrostatic generation, and is capable of generating ultrasound with different polarizations. Also, phase sensitive detection and multichannel sampling can enhance detection even for a small MDG coupling efficiency.

While the above has described MDG and detection by using specific, dual spiral, two-dimensional, flat, spirally wound coils having specific race-track shaped dual spirals, in accordance with another preferred embodiment of this invention, non-magnetic direct generation and detection of acoustic waves in the described samples is provided by two-dimensional, flat spirally wound coils that form dual spirals in a flat current sheet. To this end, the same apparatus 10 described above is used for NMDG and detection by reducing and/or eliminating the static magnetic field 20. Thus, in accordance with a first preferred embodiment for NMDG, the above described dual spiral coil 12 provides non-magnetic direct generation of acoustic waves in sample 15, whereby the dual spiral 12 of this invention has even greater utility as a transducer 21 than the above described MDG generator. To this end, a NMDG transducer 21 is provided by this invention that incorporates the above described specific dual spiral coil 12 for the generation of acoustic waves in samples 15 without the need for the above-described static magnetic field 20. In this embodiment a dual spiral coil 12' or a quartz transducer corresponding thereto can be used as the detector.

In accordance with a second preferred embodiment relating to NMDG, it has also been discovered that a single, two-dimensional, flat spirally wound coil in a plane parallel to and spaced from opposite conductive surfaces of the described samples can be used in a similar manner for NMDG and/or detection, where the generator coil is connected to the high frequency source, as previously described and the generator and detector coils are co-axially spaced on opposite sides of the sample, at a location corresponding to the described dotted line 29 in FIG. 2, Like the above-described dual spirals, this single spiral forms a flat current sheet.

The following discussion illustrates specific examples of this invention, and compares the magnetic and non-magnetic cases for directly generating and detecting the acoustic waves.

In this regard, whereas the MDG generator system of apparatus 10 involved direct electromagnetic generation of acoustic ion waves in sample 15 in the local limit, the NMDG transducer 21 of this invention produces direct electromagnetic generation of acoustic ion waves in the non-local limit. For example, it will be recalled that in the local limit, the polarization is always perpendicular to the current. Stated another way, in zero field, the polarization of the acoustic wave in sample 15 is parallel to the driving electric field produced by the coil 12, and the skin depth current is produced by the RF source 14 connected to the coil 12. Thus, the component of the non-local signal that is generated perpendicular to the driving current is called MDG, or MDG (H) if one wishes to emphasize the magnetic field dependence. Similarly, the signal component parallel to the driving current is called non-magnetic direct generation (i.e. NMDG or NMDG (H)).

At 10 MHz and at 4.2° K, the efficiency of NMDG is typically comparable to the efficiency of MDG at a few kilogauss. Like MDG, the temperature, frequency and magnetic field dependence of NMDG were measured in Al, W, Ag and K over a wise range, e.g., a wide range of $ql$, whereby it was determined that the amplitude of NMDG is roughly proportional to the electronic component of the acoustic attenuation, in accordance with theory. However, there appear to be some significant discrepancies between theory and experiment that leads to advantages of the NMDG transducer 21 and method of this invention, particularly at high frequencies due to the increasing efficiency of NMDG with increasing frequency and carrier mean free path, $l$.

In one example, the NMDG (O) signals were typically observed using a 10 MHz source 14 and a two-dimensional dual spiral 12 next to a high purity Al No. 9 crystal sample 15. The body formed by this sample 15 was cut from a single crystal ingot of 69 grade Cominco Al by a wire saw and a fine abrasive slurry, or by an electrolytic process adaptable to an acid saw using a 10 percent NaCl electrolyte, and an acid saw wire cathode twisted from 0.01 inch tungsten wire, with the sample 15 as the anode, and a cutting current of 1 amp to produce a ¾ inch diameter crystal sample 15 in about 8 hours. After lapping, this sample 15 was potted in paraffin, etched on one unpotted face for 5 minutes using 20 percent Na OH (25° C), rinsed, and electropolished using 33 percent perchloric acid (S.G. + 1.55) and 67 percent acetic annhydride for 40 minutes. Advantageously, this process resulted in a very shiny surface and a small number of pits, while flatness and parallelism of the center one-fourth inch of the sample 15 were maintained to better than 0.0002 inches by lapping, as described above. Since the samples were thick, a 10 MHz signal, which generated the NMDG (O), resulted in a three fold improvement in signal to noise over that obtained using a rectangular coil. Also, the dual, two-dimensional spirals of coil 12 in the described flat current sheet, produced a good exponential echo amplitude decay, and dramatically reduced to a small value difficulties associated with leakage, e.g., direct coupling between the transmitter transducer formed by coil 12, and a detector transducer formed by coil 12', although in this embodiment a conventional quartz transducer 21' for the detector may alternately be used to advantage. In this regard, the direct leakage signal from the transducer was generally quite small at 10 MHz. Moreover, connecting a braided copper strap between the top of the sample holder for the sample 15 and either the transmitter or receiver reduced the leakage signal significantly for the pulsed techniques employed.

In order to demonstrate that NMDG can be used for both generating and detecting sound (using no quartz transducer), the acoustic signals were generated in a sample by coil 12, which was connected to RF source 14, as shown in FIG. 1. In this case, the sample 15 was an Al No. 9 sample 15 at 4.2 K and the static magnetic field 20 was less than 25 gauss. For slightly higher fields 20 (~ 150 G), the acoustic echo completely disappeared because the MDG component did not grow rapidly enough to compensate for the reduction of the NMDG component for low fields.

It was found that the NMDG component in zero field 20, i.e., NMDG (O), proved to be higher than expected in nearly all cases. For temperature and frequency dependence measurements of NMDG (O) in sample 15, a rough proportionality with electronic attenuation was obserbed. More precisely, the ratio NMDG (O)/$\alpha$ increased slowly as $ql$ increased, e.g., in aluminum, while this ratio decreased slowly in potassium, and anomolous peaks were observed in the temperature dependence of NMDG and attenuation in tungsten. Above 30 K, the temperature dependence of NMDG (O) in the aluminum sample 15 appeared to be proportional to the real part of 1-1/G rather than to the absolute value, as would be expected. For magnetic field 20 dependence measurements, the NMDG component in sample 15, proved to be roughly proportional to the electronic attenuation. The proportionality in a potassium sample 15 was fair, and a more significant deviation from proportionality was observed in aluminum and silver samples. In this regard, free electron theory would predict proportionality within a few percent at high magnetic fields 20, and the MDG component in the non-local limit in sample 15 has an expected linear magnetic field dependence, as in the above-described local limit. Also, the high field amplitude proved to be independent of sample 15 purity as long as B/G << 1. At low magnetic fields 20, the magnetic field dependence turned out to be non-linear, as predicted by theory. However, although the onset of the non-linearity in sample 15 was always roughly the same as predicted by free eleccron theory, the observed magnitude of the deviation from linearity was generally much larger than predicted, i.e., sometimes there were maxima in MDG that were not predicted. Furthermore, it was observed that, near the Kjeldaas absorption edge, the polarization of the ultrasound produced by the apparatus of this invention in the non-local limit became for more elliptical than predicted.

It was concluded in view of the above, that good qualitative agreement between experiment and theory was found for measurement of direct generation in the local limit by the apparatus of this invention. On the other hand, in the non-local limit, some differences between experiment and theory were not suprising, e.g., because metals such as Al, Ag and W have complicated band structures, such that discrepancies with free electron theory are reasonable. It will thus be understood that although alkali metals, which have nearly free electron band structures, generally behave according to theory, the free electron model underestimates NMDG for nearly all the metals investigated. For example, in high purity electropolished aluminum, theory is low by a factor of nearly four, and in potassium at 10 MHz, the theory of the described electromagnetic generation in sample 15 is low by a factor of six. However, the same theoretical model predicts the zero field acoustic attenuation with higher accuracy. Thus, for the above-described direct generation results, even if $ql$ were an adjustable parameter, one would not get agreement between experiment and theory in most cases. Here it appears that one must look for effects influencing direct generation in sample 15 that are not common to acoustic attenuation. For example, it is plausible that forces resulting from diffuse scattering of electrons at the surface must be included in opposition to bulk forces. Oscillations in NMDG as a function of a magnetic field perpendicular to the eddy currents but parallel to the surface of the sample are believed to result from interferences between forces generated within the skin depth and forces generated by Gantmakher splashes, as described in the above-cited report.

In regard to the above, the contribution of diffuse scattering to NMDG in sample 15, would surely be reduced when the means free path approached or became small compared to the skin depth. However, the same is true for other contributions to NMDG; that is, the contributions acting on the lattice of sample 15, so it is not obvious that surface contributions to NMDG can be ignored even in the low $ql$ limit. Also, any effects resulting from phonons absorbing the electron momentum in sample 15 should be temperature dependent and could introduce further complications. In this context, a 4.2 K, the phonon lifetime, $\tau_{ph}$, is somewhat longer than the electron relaxation time and $\tau_{ph}$ can be of the order of unity at rather low frequencies, whereas the long phonon lifetime can cause a phase lag in the transfer of the electron momentum to the lattice sample 15.

Likewise, the elliptical polarization observed in the described direct generation of this invention near the Kjeldaas edge can arise from either spatially or temporally separated perpendicular forces driving the acoustic medium in sample 15. If the bulk forces are distributed over an appreciable fraction of an acoustic wavelength in sample 15, then contributions from diffuse scattering could cause non-parallel and spatially separated forces therein capable of generating an elliptically polarized wave. Moreover, since the high temperature behavior of NMDG in the described aluminum sample 15 is in disagreement with the mentioned free electron theory, this also suggests a surface contribution. In this regard, the high efficiency of the described NMDG (O) in the above-mentioned Al sample 15 has the advantage of use as a transducer at (UHF) ultra high frequencies and above. To this end, in extrapolating the linear dependence of the Al sample 15 up to several thousand MHz, as understood from the above, one can conclude that the efficiency of NMDG therein can exceed that of other transducers in that range, since the above-described diffuse electron scattering at the above-described surface is belived to play a major role in the described NMDG transducer 21 in accordance with this invention.

In operation, one embodiment of a transducer 21 will be described that employs a dual spiral coil 12 in a flat current sheet for the direct NMDG (O) generation of electromagnetic ion waves in the described sample 15 through a thin aluminum surface 19 thereof, and the detection of the described acoustic waves therefrom. In one example, a cryostat 18 having liquid helium therein, holds the sample 15 at low temperature i.e., 4.2 K, although it will be understood that this transducer 21 can be operated at high temperatures. Radiofrequency energy source 14 connected with the generator formed by coil 12, such as shown in FIG. 1, to generate radio-frequency pulses in surface 19 of any desired time interval lengths greater than $\frac{2}{3}$ $\mu$ sec. with a maximum of about 500 watts peak power, although, as will be understood in the art, a higher pulsed power supply may alternately be used.

Since low strength signal are detected by detectors formed from a dual spiral, a single spiral or a quartz detector, it is advantageous to use rf impedance matching techniques, provided by networks 55, such as described in the above-mentioned report to match the transmitter of source 14 to the generator transducer 21 and the detector transducer 21'. Because of the relatively high frequencies from source 14 and the long cable 57 involved, a wide range of adjustability was provided to accomplish the desired matching. Although fixed frequency networks 55 adjacent to the generator transducer 21 and the detector transducer 21' are efficient in eliminating cable losses and maximizing the output signals, particularly above 30 MHz, adjustable capacitors can alternately be used for work over a wide range of frequencies. In case particular rise and fall times of the detected signals are desired, resistive loadings can be added. To this end, for example, a 1 db attenuator 59 is advantageous.

An accurately calibrated rf pulse in transducer 21 having the same duration and frequency as the acoustic pulse detected, was used to calibrate I.F. amplifier 61 in one suitable system 63, which is illustrated in FIG. 1. In this regard, the calibrating pulse feeds into the front end of preamplifier 65 through a metal film resistor 67, and the frequency of this calibrating pulse was adjusted to within 100 KHz of the acoustic frequency by switching the calibration signal to CW and beating it against the acoustic signal. When these frequencies were equal, the detected echo has a characteristic zero beat pattern. Also, the system 63 provides a large on-off ratio, which is typically 60 db at 50 MHz with a HP 10514 A doubly balanced mixer 69. Since silicon dioxdes 71 have a threshold voltage for the modulating pulse provided by the system 63, the latter achieves the desired large on-off ratios. Additionally, the calibration of the system 63 advantageously has a high absolute accuracy of 0.3 db, fast rise times, and a capability of being used at below 10 MHz by substituting a suitable oscillator 73 for the HP 608 B shown in FIG. 1.

Suitable I.F. amplifiers 61 have very low noise, are highly linear, and have good overload recovery, which is advantageous for pulse echo measurements. Fast recovery of this I.F. amplifier 61 is obtained by using diode limiters in each stage thereof. In one test, a detector following an I.F. strip produced about a 10 v output for maximum input. The output was a unity gain emitter follower to isolate the detector from any load connected thereto. Because of the large level of the maximum output, the amplifier 61 advantageously provided linear operation to one decibel (db) over a 30 db input range, while a unity gain emitter follower isolated the detector from any load connected thereto. Because of the large level of the maximum output, the amplifier 61 advantageously provided linear operation to one decibel (db) over a 30 db input range.

After the amplification by amplifier 61 and the detection of the above-described acoustic signal from sample 15, an integrator 75, e.g., a standard boxcar type integrator that is commercially available, processed this acoustic signal for purposes of averaging this signal. A gate (minimum of 10 n sec.) was capable of sampling any part of the repetitive echo pattern to an accuracy of about one nanosecond (nsec). Data was taken by either placing the gate on a particular echo and varying some external parameter, such as the static magnetic field 20 or temperature, or by sweeping the gate under fixed external conditions so as to record part of the echo pattern. An oscilloscope recorded the output of the integrator on an $x - y$ recorder. For purposes of providing a transducer 21′, however, e.g., for detecting flaws in surface 19, it is understood that no magnetic field 20 is required, and the temperature of the sample 15 is held constant, e.g., at 4.2 K. On the other hand, the magnetic field 20 is used for MDG.

In regard to the relative orientation of the sample 15, the two dimensional dual spiral coils 12, and/or the magnetic field 20, the latter being present in MDG, FIG. 2 illustrate the orientation of the various elements. In the local limit of conductivity, the fields shown on the left bottom side of FIG. 2 generate shear waves polarized perpendicular to the skin depth current, J (Z); and on the right bottom side of FIG. 2, generate longitudinal waves.

For studying the comparison of MDG with NMDG (O), i.e., in the non-local limit, a study was made of the rotation patterns in potassium (K) at 9.4 MHz and at 4.2 K with fast shear waves, $q$ <110> and a two-dimensional dual spiral coil 12′ generation of the acoustic signals detected by a quartz transducer (which replaced the above-described dual spiral detector coil 12′). In this regard, the rotation patterns at progressively high fields 20 are determined, whereby it was found that although the gain was reduced by 10 decibels, the signals were elliptically polarized. It was shown that the rotation patterns in K at 30 MHz, where almost circularly polarized, yet lacked symmetry.

In regard to the above, the method of measuring the MDG (H) and NMDG (H) components involved determining the correct angular position of the spirals of the two-dimensional coils relative to the polarization of a quartz transducer detector (or in some cases, relative to the orientation of sample 15). In zero field 20, only the NMDG component was present. Here, since there could be no magneto-acoustic rotation, the direction (angular position) of the magnetic component was very accurately the position of the minimum in the zero field 20 rotation pattern. On the other hand, the NMDG (H) component was usually taken to be at the angular position corresponding to the minimum in the output signal at fields well below the Kjeldaas edge. Going from low to high fields 20, the orientation of the two-dimensional spirals for a maximum output signal would usually rotate 90°, as was seen by the typical set of rotation patterns in K at 10 MHz, which demonstrated that the polarization of the wave rotated as the field 20 was changed.

In review of the above, the race-track shaped, flat, dual-spiral, two-dimensional coil of this invention, i.e., the coil 12 of FIG. 2, provides the direct generation of acoustic waves in the surface 19 of a sample 15, the production of acoustic waves at the surface boundary of the sample 15, and the detection of these acoustic waves. In this regard, this invention provides both NMDG (O) and MDG (H). Also, while the above has primarily discussed specific spirals for generation and detection, it is understood that crystal transducers can be substituted for the detector spirals. Also, while square or rectangular shaped samples 15 have been discussed, it will also be understood that samples 15 may have other shapes.

Additionally, while the above has discussed in detail specific transducers 21 and 21′ having specific spiral coils forming specific current sheets for specific direct generation and/or detection of acoustic waves, because these coils are relatively easy to construct, it will be understood by one skilled in the art that other two-dimensional coils forming like flat current sheets can be made in accordance with the teachings of this invention for the purposes described herein. In this regard, such two-dimensional coils are thought to be particularly useful in the field of NMDG for the purposes described herein. To this end it is thought to be advantageous to use the two dimensional coils in conjunction with a like detector coil or a quartz transducer on the opposite sides of the sample co-axially with the central region 27 (shown by the dotted lines in FIG. 2) to produce and detect useful non-magnetic directly generated acoustic signals. Here, the two dimensional coils thought to be advantageous are those having closely wound, spaced apart turns in a flat current sheet having a uniform current distribution therein for producing the described electromagnetic fields with a constant wave front, the current sheet being spaced from and parallel with a conductive surface of the described sample body.

It will also be understood that this invention has the advantage of providing specific spirals for the direct generation and/or detection of acoustic and electromagnetic waves, that the described system of this invention has the advantage of high signal-to-noise ratios, and that this invention provides a high frequency transducer.

What is claimed is:

1. In an ultrasound transducer having radiofrequency source means for producing electromagnetic fields at a conductive surface of a first means that is conductive, the improvement, comprising a system consisting of:

a two-dimensional, flat, spirally wound, dual-spiral, race-track shaped coil means comprising two spirals each of race-track shape adjacent one another in a plane and together forming a pair of oppositely wound sections in a flat current sheet in a plane parallel to and spaced from said conductive surface and connected to said ratio-frequency source means for transmitting said electromagnetic fields to said conductive surface so that said coil means directly generates acoustic waves that propagate in said first means to excite currents at another surface of said first means.

2. The sections of claim 1 having another pair of sections forming a dual-spiral coil similarly constructed and arranged adjacent said first means so that said first means is interposed between said two pairs of transducer sections, whereby one of said pairs generates said acoustic waves, and said other of said pairs detect said acoustic waves.

3. The sections of claim 1 having straight and connecting end portions that are continuously connected to form adjacent spirals wound in opposite directions so that currents are oppositely directed in said spirals in a flat current sheet.

4. The sections of claim 3 in which said straight sections are parallel with each other and form a constant wave front under a central circular region thereof.

5. The sections of claim 1 having magnetic field means for immersing said first means in a static magnetic field for producing said acoustic waves by magnetic direct generation.

6. The sections of claim 5 having means for selectively reducing the strength of said magnetic field to produce said acoustic waves by non-magnetic direct generation.

* * * * *